(12) United States Patent
Perry (10) Patent No.: US 8,444,041 B2
(45) Date of Patent: May 21, 2013

(54) BRAZING SYSTEM AND METHOD

(75) Inventor: Douglas S. Perry, Flowery Branch, GA (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/083,168

(22) Filed: Apr. 8, 2011

(65) Prior Publication Data

US 2012/0255988 A1    Oct. 11, 2012

(51) Int. Cl.
*B23K 3/00*        (2006.01)
*F15C 3/00*        (2006.01)

(52) U.S. Cl.
USPC ............ 228/8; 228/102; 137/88; 431/12; 431/130

(58) Field of Classification Search
USPC . 228/8, 9, 12, 102, 902; 137/88, 334; 431/12, 431/89, 130
See application file for complete search history.

(56) References Cited

U.S. PATENT DOCUMENTS

| | | | | |
|---|---|---|---|---|
| 2,914,642 A | | 11/1959 | Portor | |
| 3,246,849 A | * | 4/1966 | Aske | 239/304 |
| 3,905,394 A | * | 9/1975 | Jerde | 137/599.04 |
| 4,103,829 A | * | 8/1978 | Zagara et al. | 239/304 |
| 4,568,277 A | | 2/1986 | MacInnes et al. | |
| 4,605,034 A | * | 8/1986 | Urushida | 137/88 |
| 4,776,366 A | | 10/1988 | Czerwinski et al. | |
| 4,838,295 A | | 6/1989 | Smith et al. | |
| 4,930,550 A | * | 6/1990 | Czerwinski et al. | 137/334 |
| 5,125,555 A | | 6/1992 | Grisoni et al. | |
| 5,779,466 A | * | 7/1998 | Okamura | 431/89 |
| 5,901,897 A | * | 5/1999 | Takahashi et al. | 228/8 |
| 6,693,263 B2 | | 2/2004 | Nishimura | |
| 6,708,719 B2 | * | 3/2004 | Idoguchi | 137/266 |
| 2003/0213520 A1 | | 11/2003 | Prinz et al. | |
| 2009/0242037 A1 | * | 10/2009 | Drescher | 137/14 |

FOREIGN PATENT DOCUMENTS

| | | |
|---|---|---|
| GB | 1245274 | 9/1971 |
| GB | 1537013 | 12/1978 |
| KR | 100303244 | 7/2001 |

OTHER PUBLICATIONS

Smith Equipment Interactive Catalog, Jan. 16, 2011, 77 pages, http://www.smithequipment.com/products/smithcatalog2010.pdf.

* cited by examiner

*Primary Examiner* — Devang R Patel
(74) *Attorney, Agent, or Firm* — Hahn Loeser & Parks LLP (57) ABSTRACT

A brazing system has a first gas source, a second gas source, a first enclosure, a second enclosure, a brazing torch, and a control system configured to control a ratio of the first gas source and the second gas source.

8 Claims, 5 Drawing Sheets

Fig. 1

PRIOR ART

BRAZING SYSTEM AND METHOD

TECHNICAL FIELD

The invention described herein relates generally to a brazing system with reproducible gas flow rate control using a plurality of gases and method for achieving the same.

BACKGROUND OF THE DISCLOSURE

Brazing is one of the known method of joining metal members together with a brazing filler, i.e., a metal or alloy having a lower melting point than the metals to be joined. Brazing typically involves the use of a torch having at least two needle metering valves that control the flow and ratio of at least two welding gases. One of the gases will include a flammable fuel gas such as LP gas, natural gas, acetylene gas, methane, propane, butane, hydrogen and mixtures and combinations thereof, while the other gas will include a combustion-assisting gas such as oxygen or air. Needle metering valves are used to manually adjust the flow of the gases before and during brazing because the pressure, flow rate, and/or quality of the gases can vary and, in some cases, lead to quality issues. Adjustment is needed due to a variety of reasons, including changes in external temperature, the total amount of gas used, or the amount of gas remaining in a cylinder, all variables which affect gas flow rates. In addition, a torch operator, even an operator with many years of experience, can have a very difficult time setting the needle valves and determining if the gas mixture creates a flame having an acceptable oxygen to fuel ratio.

In view of the foregoing problems and shortcomings of existing brazing systems with torches having a plurality of adjustment valves, the present application describes a brazing system and method to overcome these shortcomings.

SUMMARY OF THE DISCLOSURE

In accordance with the present invention, there is provided a system including at least two separate gases, at least one enclosure for each gas source, a brazing torch, and a means for determining a gas ratio between the at least two gases where the means is separate from the brazing torch. The at least two enclosures have first inlets and first outlets, a regulator valve, and a micrometer valve. The brazing torch includes an operating trigger but does not include control valves. The system includes a means for determining a gas ratio between the at least two gases.

Also within the scope of the invention is a brazing system including a first gas source, a second gas source, a first enclosure, a second enclosure, a first flow meter, a second flow meter, a brazing torch, and a control system configured to control a ratio of the first gas source and the second gas source. Each enclosure includes a first inlet, a first outlet, and a regulator and a micrometer valve inside the enclosure. The brazing torch includes an operating trigger but does not include control valves.

Also within the scope of the invention is a brazing method including attaching a fuel source and an oxygen source to a brazing control system, setting parameters, loading at least a target gas ratio into the brazing control system, determining whether an actual gas ratio is acceptable, adjusting the brazing control system. Further, the method includes brazing by activating a trigger on a brazing torch not having control valves.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. The showings in the drawings are for purposes of illustrating the preferred embodiment of the invention only and not for purposes of limiting the same.

Figure 1:
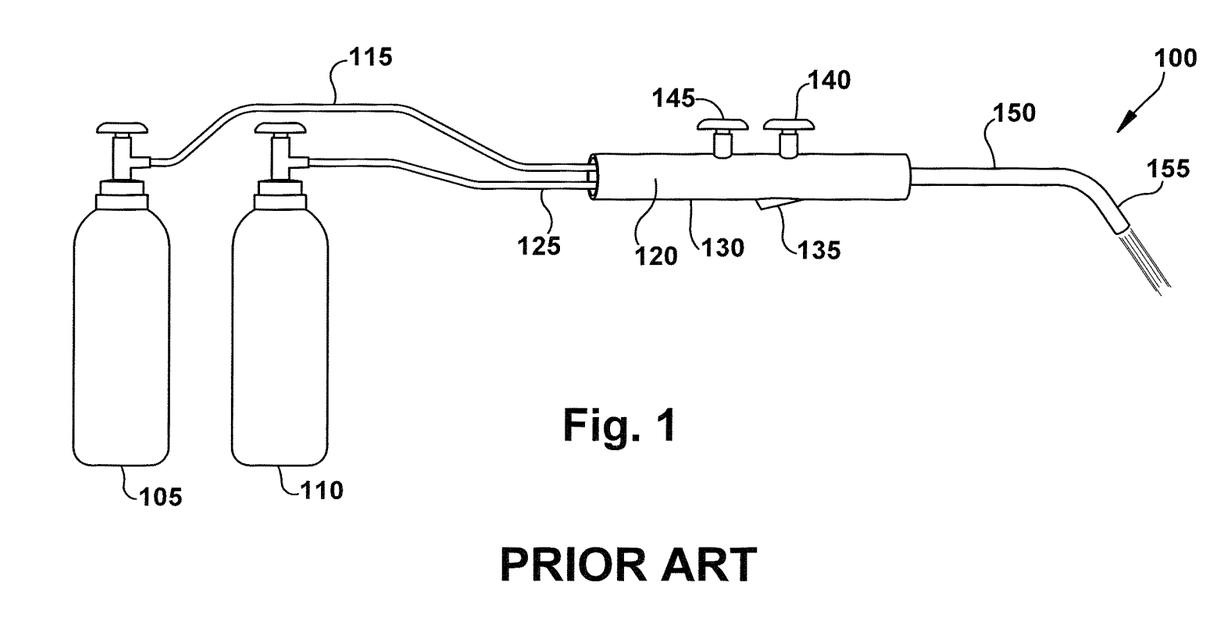
FIG. 1 is a side elevational view of a brazing system in which flow control is achieved using metering valves positioned on the torch.

FIG. 1 illustrates a brazing system 100 in which metering valves are positioned on the torch, and includes first gas source 105 and second gas source 110, wherein first gas source 105 is oxygen or air and second gas source 110 is a fuel, including at least one of the following: acetylene, propane, natural gas or methane, propylene, hydrogen, and butane or blends thereof. First gas hose 115 connects to first gas source 105 and to brazing torch 120, and second gas hose 125 connects to second gas source 110 and to brazing torch 120.

In the illustrated embodiment, brazing torch 120 includes handle or torch body 130, on/off switch 135, first needle valve 140, second needle valve 145, brazing torch neck 150, and brazing tip 155. To use conventional brazing system 100, an operator opens valves on first gas source 105 and second gas source 110, opens first needle valve 140 and second needle valve 145 to form a flammable gas mixture, and ignites the gas mixture exiting brazing tip 155. It is understood that the gas sources can be from gas tanks that have pressure regulators or from main supply lines that have pressure regulators. After ignition, the brazing torch operator will make adjustments to first needle valve 140 and second needle valve 145 to react to real or perceived inconsistencies in the brazing flame. Further, needle valve settings may be changed due to inconsistencies in the brazing joint caused by fluctuations in gas pressure and flow rates and inaccurate gas mixtures. As discussed above, even very experienced torch operators have difficulty setting flames with consistent oxygen to fuel ratios.

Figure 2:
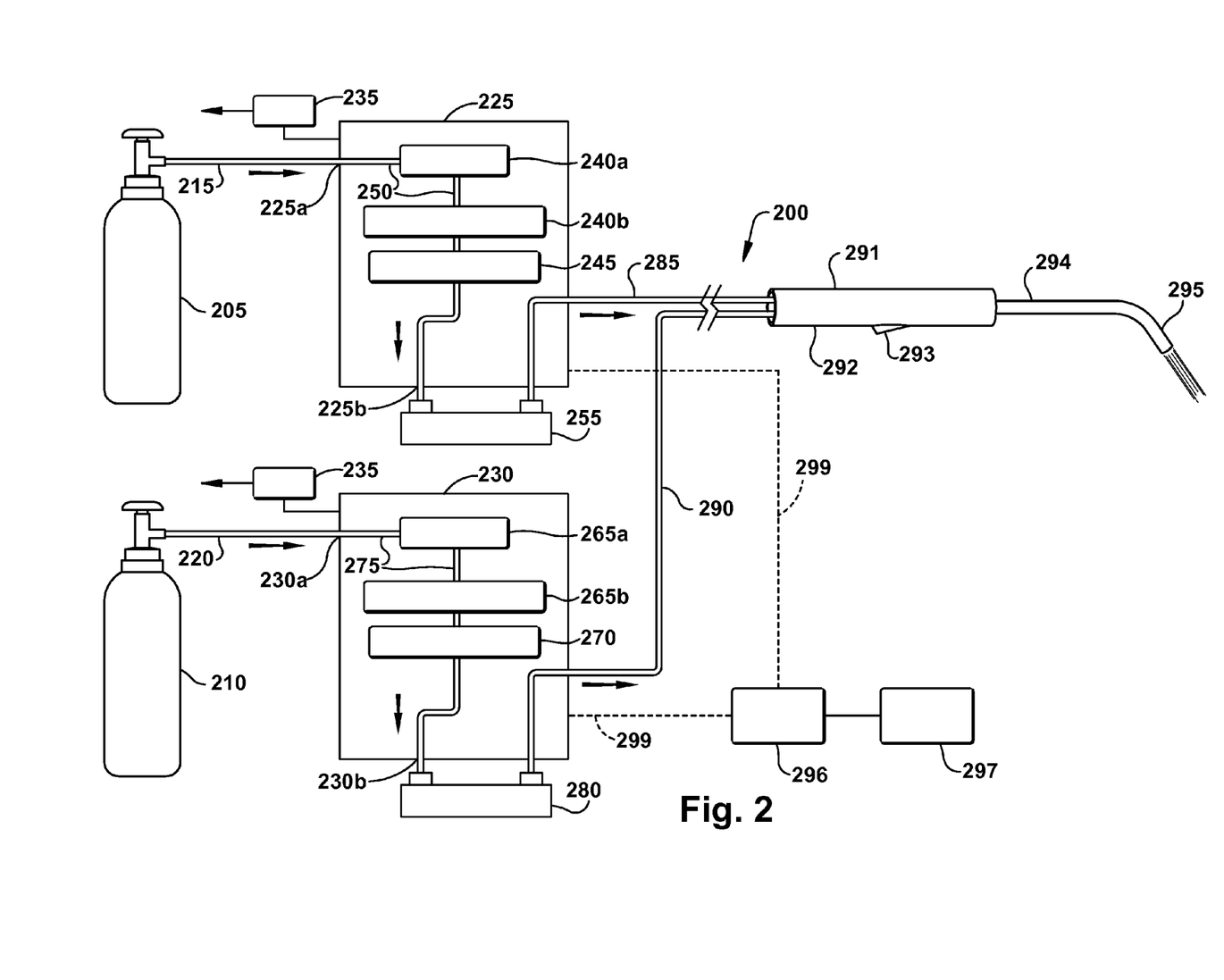
FIG. 2 is a schematic of another brazing system.

FIG. 2 illustrates brazing system 200 that produces a brazing flame having a consistent oxygen to fuel ratio every time the operator ignites the brazing torch. Brazing system 200 includes first gas source 205 and second gas source 210, wherein first gas source 205 is oxygen or air and second gas source 210 is a fuel, including at least one of the following: acetylene, propane, natural gas or methane, propylene, hydrogen, and butane or blends thereof. As mentioned above, it is understood that the gas sources can be from gas tanks that have pressure regulators or from main supply lines that have pressure regulators. First gas hose 215 connects to first gas source 205 and to first enclosure 225, and second gas hose 220 connects to second gas source 210 and to second enclosure 230. First enclosure 225 and second enclosure 230 are made from materials and constructed to meet NEMA 4X specifications as hereinbelow defined. At least two enclosures are required in brazing system 200 to prevent mixing of the oxygen/air with the fuel before the gases reach the brazing torch where they form a mixed gas. In case of a gas leak inside first enclosure 225 and/or second enclosure 230, each enclosure or a component inside each enclosure includes a pressure relief valve 235 that exhausts to an external atmosphere. In another embodiment (not shown), the brazing system includes more than two gases and more than two enclosures. In yet another embodiment (not shown), at least one enclosure includes a gas leak detection system.

As used in this application, "NEMA 4X" means an enclosure which is fabricated from stainless steel or plastic, including airtight and non-airtight enclosures. The NEMA 4X enclosure can be used in harsher environments than standard NEMA 4 units since the NEMA 4X enclosure has corrosion resistance. Applications where corrosive materials (for example saltwater) and caustic cleaners are used necessitate the use of a NEMA 4X enclosure.

In the illustrated embodiment of FIG. 2, first gas hose 215 connects to first inlet 225a and supplies gas to tubing 250 that connects to first regulator valve 240a. First regulator valve 240a reduces and maintains pressure of first gas source 205 to downstream points of use. Tubing 250 extends between first inlet 225a, first regulator valve 240a, first micrometer valve 240b or variable orifice, optional pressure gauge 245, and first outlet 225b. In another embodiment (not shown), micrometer valve or variable orifice can be replaced with a fixed orifice when the brazing system is being used for a specific product or process or can be replaced with flow meters with integral valves. In the illustrated embodiment, first outlet 225b of first enclosure 225 connects to optional first flow meter 255 outside of the enclosure, either adjacent or at a distance from first enclosure 225. First regulator valve 240a and first micrometer valve 240b can be manually or electrically controlled to set and/or maintain a first pressure and a first flow rate, respectively, of first gas source 205. First flow meter 255 can be manually or electrically measured.

Further in the illustrated embodiment, second gas hose 220 connects to first inlet 230a and supplies gas to tubing 275 that connects to second regulator valve 265a. Tubing 275 extends between first inlet 230a, second regulator valve 265, second micrometer valve 265b or variable orifice, optional pressure gauge 270, and first outlet 230b. In another embodiment (not shown), micrometer valve or variable orifice can be replaced with a fixed orifice when the brazing system is being used for a specific product or process. In the illustrated embodiment, first outlet 230b of second enclosure connects to optional second flow meter 280 outside of the enclosure, either adjacent or at a distance from second enclosure 230. Second regulator valve 265a and second micrometer valve 265b can be manually or electrically controlled to set and/or maintain a second pressure and a second flow rate, respectively, of second gas source 210. Second flow meter 280 can be manually or electrically measured. It is understood that the tubing, regulator valves, pressure gauges, micrometer valves, and flow meters can be arranged in another configuration other than what is illustrated in FIG. 2 as long as the pressures and flow rates of first gas source and second gas source are controlled.

First gas source 205 flows from first enclosure 225 into first brazing torch gas hose 285, and second gas source 210 flows from second enclosure 230 into second brazing torch gas hose 290. First brazing torch gas hose 285 and second brazing torch gas hose 290 connect to brazing torch 291. Brazing torch 291 includes handle 292, operating trigger 293 or on/off switch, neck 294, and brazing tip 295. Brazing torch 291 includes an internal portion (not shown) where the gases mix before exiting the brazing torch 291 at brazing tip 295.

An operator activates operating trigger 293 on brazing torch 291 to start brazing, but brazing torch 291 does not include a plurality of control valves positioned on the torch for adjustment of first gas 205 and second gas 210 as illustrated in FIG. 1. Instead, an operator using brazing system 200 uses control system 296 having user interface 297 or the operator manually makes adjustments to brazing system 200 based on settings entered into and received from control system 296 having user interface 297. Control system 296 includes optional control connections 299 that connect to components in first enclosure 225 and/or second enclosure 230. In another embodiment (not shown), control system is a wireless control system. In yet another embodiment (not shown), the brazing torch includes a plurality of valves, on/off valves for example, positioned on the torch that are wide open, therefore, the operator using the brazing system uses the control system having user interface or the operator manually makes adjustments to the brazing system based on settings entered into and received from the control system having user interface.

In the illustrated embodiment, control system 296 includes a plurality of parameters, including at least two gases, at least two pressures, at least two coefficients of flow, at least two flow rates, at least two micrometer readings, and at least one type of brazing flame. At least one of the plurality of parameters is entered into user interface 297 and saved and stored in control matrix 298, and control system 296 is configured to determine or calculate at least one parameter.

Further in the illustrated embodiment, control system 296 is configured to determine and/or to control at least a ratio of flow rates of first gas 205 and second gas 210, also known as the oxygen to fuel ratio. Each of the fuel gases, including acetylene, propane, natural gas or methane, propylene, hydrogen, and butane, has a range of oxygen to fuel ratio that produces a consistent brazing flame every time the operator lights the brazing torch. For example, the oxygen to fuel ratio is set to reproducibly produce a targeted and maximized oxidizing flame, a neutral flame, a carburizing flame, or any flame having characteristics between the above identified flames as known by those of skill in the art.

As discussed above, brazing system 200 includes an automated control system 296 having user interface 297 or alternatively includes control system 296 having user interface 297 where the operator makes manual adjustments. In brazing system 200 where the operator makes manual adjustments, an operator enters the types of gases, for example oxygen and propane, reads the pressures from the regulator valves and settings of the micrometer valves, and enters these readings into the user interface 297 of the control system 296. Control system 296 determines or calculates the flow rates and coefficients of flow for the gases and the gas ratio for the gas combination and indicates whether the gas ratio is within an acceptable range. If the operator decides that the brazing system is properly setup, the operator saves the settings and can lock the enclosures that house the regulator valves and micrometer valves and the brazing flame will have an oxygen to fuel ratio that produces a consistent brazing flame every time the operator lights the brazing torch. If not properly setup, the operator makes changes to at least one of the regulators and/or micrometers and repeats the previous process.

In a brazing system 200 with an automated control system 296 having user interface 297, an operator enters or selects at least the types of gases from a list of gases in user interface 297 and control system 296 will determine at least one of the following: pressure readings from the regulator valves, readings from the micrometer valves, gas flow rates, coefficients of flow, and the gas ratio. Control system 296 indicates whether the gas ratio is within an acceptable range and can be saved and locked so that settings can be selected and so changes can only be made by operating personnel with system access. Once saved and/or locked, the brazing system will provide a flame that will have an oxygen to fuel ratio that produces a consistent brazing flame every time the operator lights the brazing torch. If the gas ratio is not within an acceptable range, control system 296 can be configured to make adjustments to at least one regulator and/or micrometer until the gas ratio is within an acceptable range. In another embodiment, the control system includes a user interface whereby a target for at least one of the following may be entered by an operator and an actual value of at least one of the following may be monitored by the control system: a gas type, a pressure, a micrometer setting, a coefficient of flow, at least one flow rate, a gas ratio, and at least one type of brazing flame.

Figure 3:
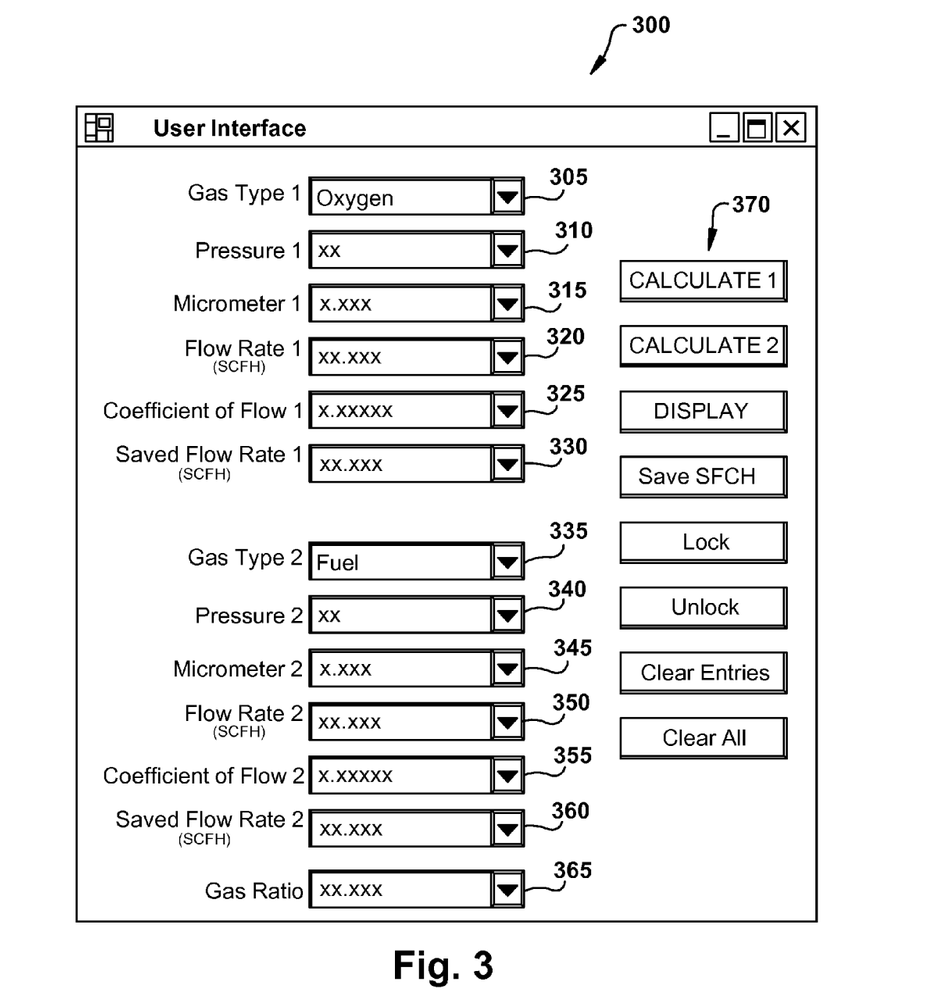
FIG. 3 is a schematic of a brazing system user interface.

FIG. 3 illustrates user interface 300, an example of the user interface that connects to control system 296, discussed above. In the illustrated embodiment, user interface 300 includes a plurality of parameters, including: gas type one 305, pressure one 310 in pounds per square inch (PSIG), micrometer setting one 315, flow rate one 320 in standard cubic feet per hour (SCFH), coefficient of flow one 325, and saved flow rate one 330. Further, user interface 300 includes gas type two 335, pressure two 340 in pounds per square inch (PSIG), micrometer setting two 345, flow rate two 350 in standard cubic feet per hour (SCFH), coefficient of flow two 355, and saved flow rate two 360.

In the illustrated embodiment, user interface 300 calculates gas ratio 365 or the oxygen to fuel ratio for gas type one and gas type two and indicates whether the gas ratio is within an acceptable range. If a manual control system is being used, an operator compares the gas ratio to a table of acceptable gas ratios. It is understood that the user interface can be arranged in another configuration other than what is illustrated in FIG. 3 as long as the plurality of parameters can be manually entered or electronically monitored and entered. For example, user interface can include one entry location and a drop down list that an operator can choose from or enter each of the following: gas type, pressure, micrometer setting, flow rate, coefficients of flow, saved flow rate, and gas ratio. Further, user interface 300 includes at least one button or graphical user interface portion 370, including but not limited to the following: calculate, display, save, lock, unlock, acceptable range, unacceptable range, clear entries, and clear all. Because parameters can be saved, a user can lookup previously saved settings in user interface 300 and select the same parameters for an upcoming brazing operation. Further, user interface can include a security or lock system to limit additions to or changes to the control system.

Figure 4:
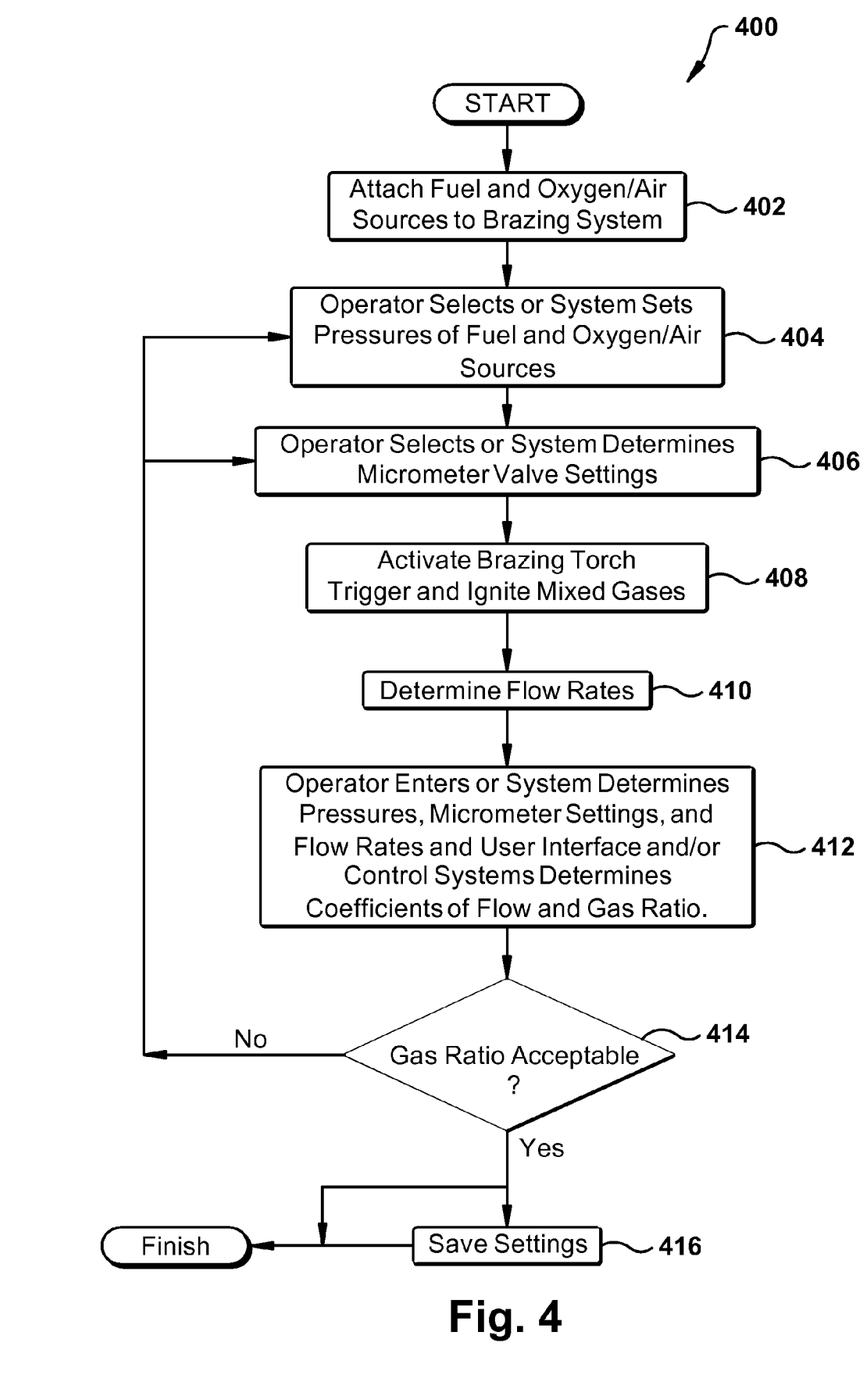
FIGS. 4-6 are flow charts illustrating embodiments of a brazing method.

A user interface 300 or computer illustrates one possible hardware configuration to support the systems and methods described herein, including the methods 400 below. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The computer or the user interface 300 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The computer or the user interface 300 can further include a hard disk drive, a magnetic disk drive, e.g., to read from or write to a removable disk, and an optical disk drive, e.g., for reading a CD-ROM disk or to read from or write to other optical media. The computer or the user interface 300 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the user interface 300.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface 300 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with user interface 300 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the user interface 300 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

FIG. 4 is a flow chart illustrating, for example only, one embodiment of a brazing method 400 using brazing system 200. As shown in FIG. 4, an operator attaches fuel and oxygen or air sources to the brazing system at 402. The pressures for the fuel and oxygen are selected by an operator or set by the system at 404 and the micrometer valves are set by the operator or system at 406. Brazing torch trigger is activated by operator and the mixed gases are ignited at 408. At 410, the operator reads flow rates from the flow meters or the system automatically takes the same readings. At 412, the operator enters pressures, micrometer settings, and flow rates into user interface or the system determines these values and the user interface calculates the coefficients of flow and the gas ratio for the selected gases. At 414, user interface indicates whether the gas ratio is acceptable or the operator compares the gas ratio to a table of acceptable gas ratios for the combined gases. If gas ratio is not acceptable, pressures of gases can be changed at 404 and/or micrometer valve settings can be changed at 406. If the gas ratio is acceptable, the operator starts/continues brazing operation and settings can be optionally saved for later usage at optional 416. It is understood that the brazing method 400 using brazing system 200 can be arranged in another configuration other than what is illustrated in FIG. 4 as long as an operator can determine that the gas ratio is within an acceptable range.

Figure 5:
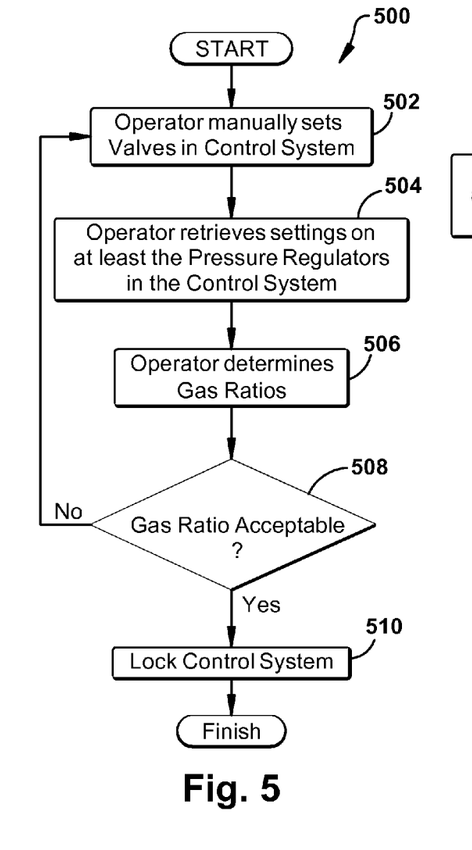

FIG. 5 is another flow chart illustrating, for example only, an embodiment of a brazing method 500 using brazing system 200. As shown in FIG. 5, an operator manually sets valves in a control system that is part of the brazing system at 502. For example, the pressures for the fuel and oxygen are selected and/or the micrometer valves are set by an operator. At 504, the operator manually retrieves settings on at least one of the pressure regulators in the control system. The operator determines the gas ratios at 506 and then determines if the gas ratio is acceptable at 508. At 508, the operator compares the gas ratio to a table of acceptable gas ratios for the combined gases. If gas ratio is not acceptable, the operator can change valve settings at 502. If the gas ratio is acceptable, the operator locks the control system at optional 510. It is understood that the brazing method 500 using brazing system 200 can be arranged in another configuration other than what is illustrated in FIG. 5 as long as an operator can determine that the gas ratio is within an acceptable range.

Figure 6:
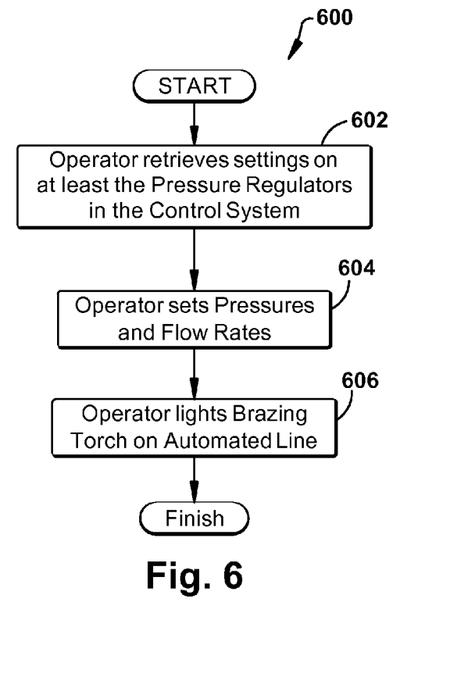

FIG. 6 is another flow chart illustrating, for example only, an embodiment of a brazing method 600 using brazing system 200. As shown in FIG. 6, an operator retrieves known gas ratios, pressures, and flow rates at 602. For example, the gas ratios, pressures, and flow rates may be known because the brazing system had been previously used and these values were recorded. At 604, the operator sets pressures and flow rates in the brazing system that may be part of an automated brazing operation, for example a furnace having multiple brazing stations or a round indexing brazing machine. The operator then lights the brazing torch at 606, wherein the flame from the brazing torch may have the gas ratio retrieved by the operator.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A brazing system comprising:
a first gas source and a second gas source;

a first enclosure having a first inlet, a first outlet, a first regulator valve, and a first micrometer valve, wherein the first gas source is connected to the first inlet of the first enclosure and the first regulator valve and the first micrometer valve are inside the first enclosure;

a first flow meter connected to the first outlet of the first enclosure;

a second enclosure having a first inlet, a first outlet, a second regulator valve, and a second micrometer valve, wherein the second gas source is connected to the first inlet of the second enclosure and the second regulator valve and the second micrometer valve are inside the second enclosure;

a second flow meter connected to the first outlet of the second enclosure; and further wherein the first and second enclosures are separate;

a brazing torch having an operating trigger;

a control system controlling at least one of the first regulator valve, the first micrometer valve, the second regulator valve, and the second micrometer valve, said control system regulating a ratio of the first gas source and the second gas source, wherein the control system further includes a user interface whereby a target for at least one of the following may be entered by an operator and an actual value of at least one of the following may be monitored by the control system: a gas type, a pressure, a micrometer setting, a coefficient of flow, at least one flow rate, a gas ratio, and at least one type of brazing flame, and further wherein the first enclosure and the second enclosure further include pressure relief valves that exhaust to an external atmosphere.

2. The brazing system of claim 1, wherein the first gas source comprises oxygen and the second gas source comprises a fuel, and wherein the fuel is selected from the group consisting of at least one of the following: acetylene, propylene, propane, natural gas, hydrogen, butane, and methane.

3. The brazing system of claim 1 further comprising a lock configured to limit additions to or changes to the control system.

4. The brazing system of claim 1, wherein the first flow meter and the second flow meter each include an orifice valve.

5. The brazing system of claim 1, wherein the first enclosure and the second enclosure further include pressure gauges.

6. The brazing system of claim 1, wherein the first regulator valve, the second regulator valve, the first micrometer valve, the second micrometer valve, the first flow meter, and the second flow meter are automated or manual and include at least one of the following types of controls: pneumatic, electrical, mechanical.

7. The brazing system of claim 1, wherein the control system is configured to control the first flow meter and the second flow meter.

8. The brazing system of claim 1, wherein the user interface determines a first setting for the first flow meter and a second setting for the second flow meter, and the first flow meter and the second flow meter are manually set.

* * * * *